(12) United States Patent
Fildebrandt

(10) Patent No.: US 7,461,346 B2
(45) Date of Patent: Dec. 2, 2008

(54) EDITING BROWSER DOCUMENTS

(75) Inventor: Ulf Fildebrandt, Schwetzingen (DE)

(73) Assignee: SAP AG, Walldorf (DE)

( * ) Notice: Subject to any disclaimer, the term of this patent is extended or adjusted under 35 U.S.C. 154(b) by 710 days.

(21) Appl. No.: 10/209,280

(22) Filed: Jul. 30, 2002

(65) Prior Publication Data

US 2004/0021699 A1 Feb. 5, 2004

(51) Int. Cl.
*G06F 3/00* (2006.01)
(52) U.S. Cl. .................................... 715/747
(58) Field of Classification Search ................ 715/770, 715/762, 835, 747
See application file for complete search history.

(56) References Cited

U.S. PATENT DOCUMENTS

| | | | | |
|---|---|---|---|---|
| 5,742,286 | A * | 4/1998 | Kung et al. .................. | 715/839 |
| 5,754,179 | A * | 5/1998 | Hocker et al. ............... | 715/835 |
| 5,793,365 | A * | 8/1998 | Tang et al. .................. | 715/758 |
| 5,815,154 | A * | 9/1998 | Hirschtick et al. .......... | 715/853 |
| 5,845,299 | A | 12/1998 | Arora et al. ................. | 707/513 |
| 5,956,030 | A * | 9/1999 | Conrad et al. ............... | 715/769 |
| 5,956,736 | A | 9/1999 | Hanson et al. .............. | 707/513 |
| 6,233,600 | B1 * | 5/2001 | Salas et al. .................. | 709/201 |
| 6,246,411 | B1 * | 6/2001 | Strauss ....................... | 715/863 |
| 6,346,956 | B2 * | 2/2002 | Matsuda ..................... | 715/848 |
| 6,415,307 | B2 * | 7/2002 | Jones et al. .................. | 715/525 |
| 6,907,580 | B2 * | 6/2005 | Michelman et al. ......... | 715/856 |
| 7,181,679 | B1 * | 2/2007 | Taylor ........................ | 715/501.1 |
| 2002/0023077 | A1 * | 2/2002 | Nguyen et al. ............... | 707/1 |
| 2002/0169826 | A1 * | 11/2002 | Yano et al. .................. | 709/203 |
| 2003/0066032 | A1 * | 4/2003 | Ramachandran et al. .... | 715/513 |
| 2003/0200234 | A1 * | 10/2003 | Koppich et al. ............. | 707/203 |

FOREIGN PATENT DOCUMENTS

EP 0717342 A1 6/1996

OTHER PUBLICATIONS

"Drag and Drop Available Target Indicator"; *Research Disclosure*, No. 341; Sep. 1992; Ernsworth, GB; p. 711, XP000320168.

* cited by examiner

*Primary Examiner*—Stephen S. Hong
*Assistant Examiner*—Le Nguyen
(74) *Attorney, Agent, or Firm*—Finnegan, Henderson, Farabow, Garrett & Dunner, LLP

(57) ABSTRACT

Methods, systems and computer program products for manipulating components in a browser document having multiple browser components. A display device visualizes the browser document. The display device indicates at least one editable browser component. A selection of a selected editable browser component is received. The display device indicates at least one target browser component for the selected editable browser component. When a selection of a selected target browser component is received, the browser document is modified accordingly.

21 Claims, 5 Drawing Sheets

AT TIME T2

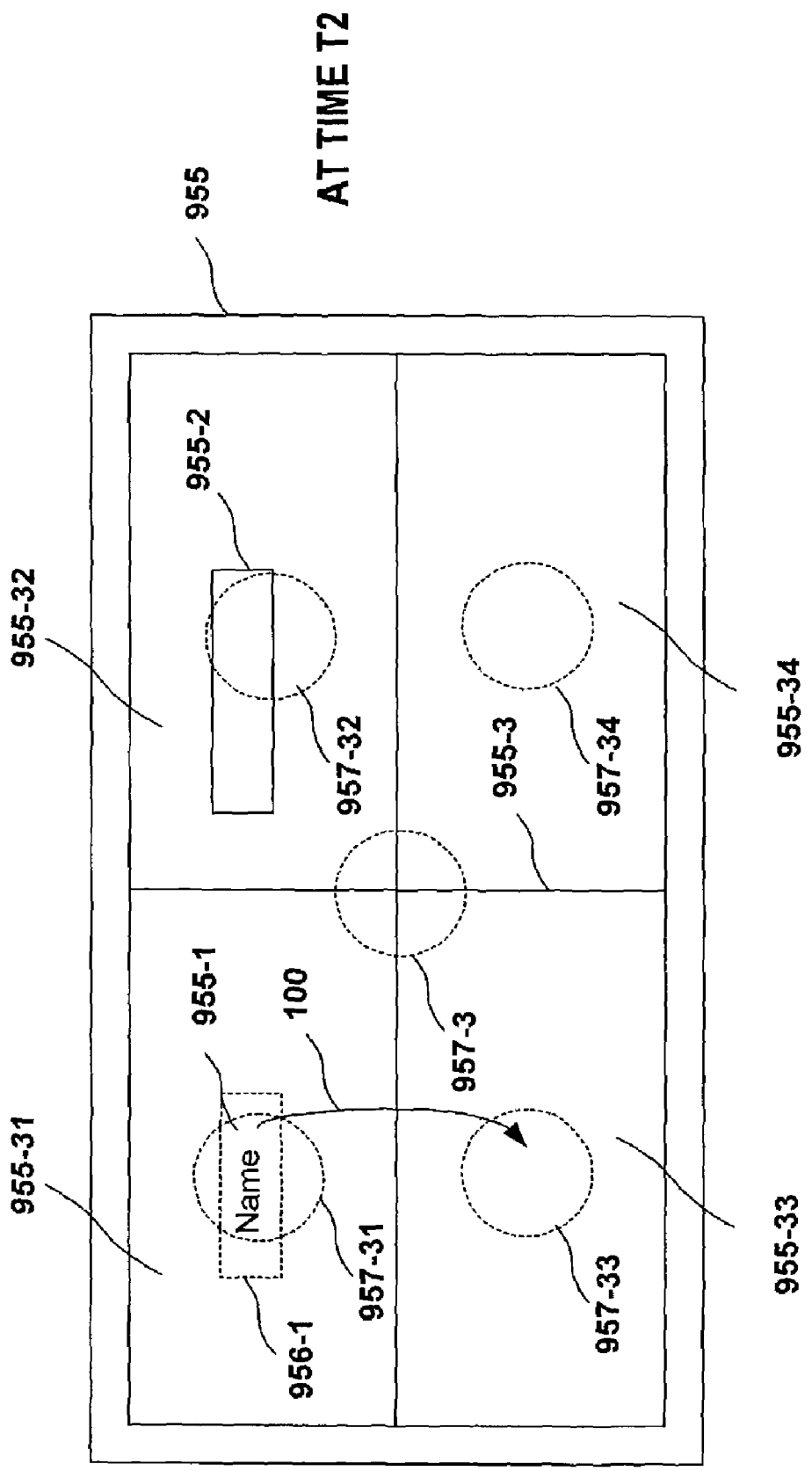

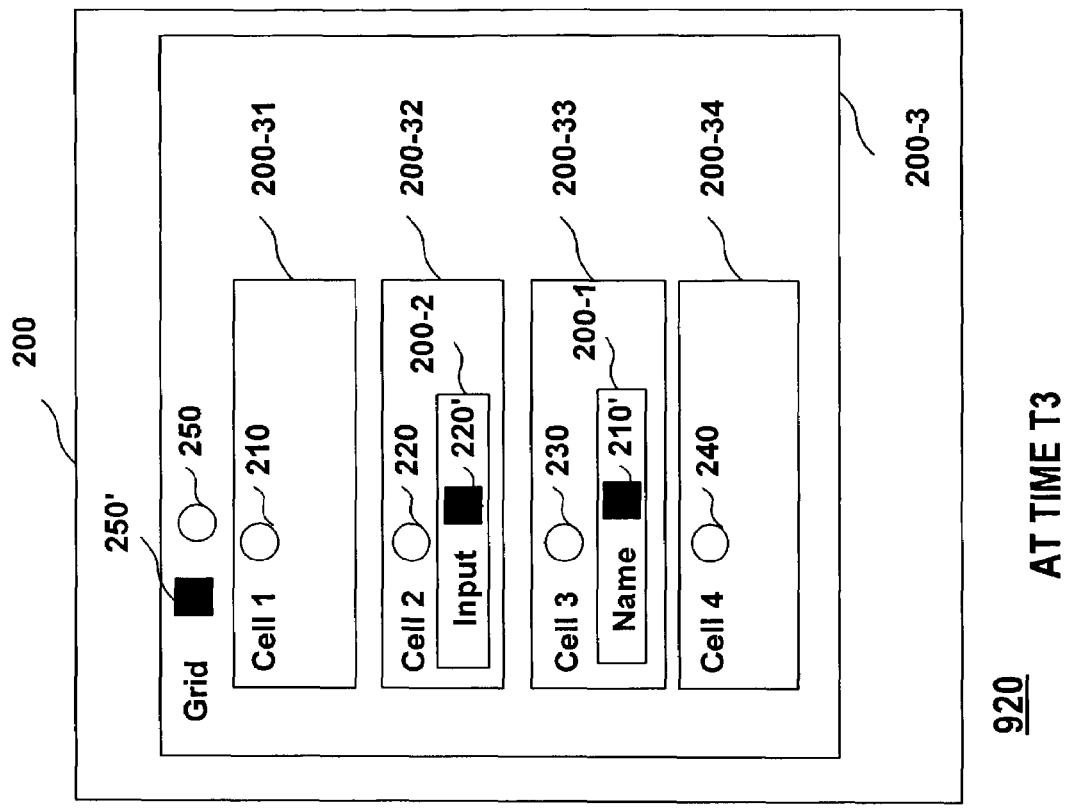
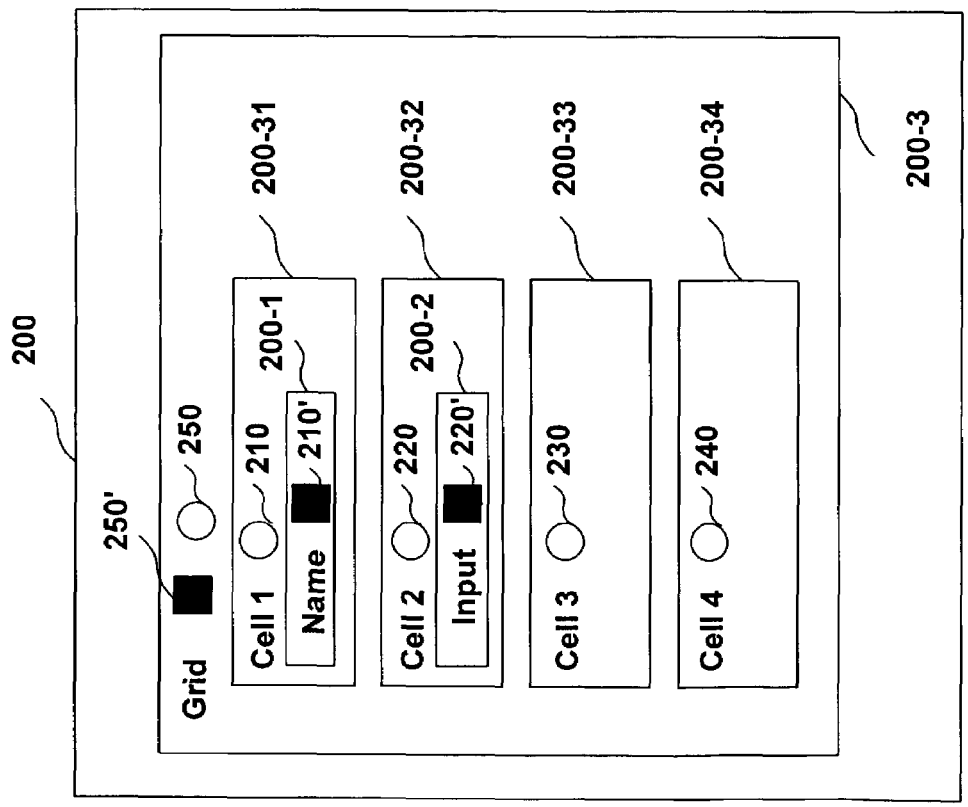

EDITING BROWSER DOCUMENTS

BACKGROUND

The present invention relates to editing browser documents.

Extensible Markup Language (XML) and Hypertext Markup Language (HTML) documents are structured documents that generally include multiple components. Typically, these structured documents can be visualized by a conventional Internet browser, such as the Microsoft® Internet Explorer. In this specification, structured documents and components will also be referred to as browser documents and browser components, respectively. In typical browser documents, browser components are arranged in a tree structure. In the tree structure, a parent browser component can have multiple child browser components, thus defining a subtree. The root node in the tree structure corresponds to the browser document.

A browser document can be edited with conventional graphical editors, such as Microsoft FrontPage® for HTML documents. During editing of the browser document, these graphical editors also manage changes in the tree structure of the browser document, which can result, e.g., from moving, copying, or deleting a browser component. To manage the tree structure of the browser document, the graphical editor can use an HTML table tag for each browser component. The table tags are organized in a tree structure that corresponds to the tree structure of the browser components. Each table tag has a graphical representation, which the user can manipulate to place the corresponding browser component at a specific location within the graphical editor. The graphical editor recognizes plain HTML elements and assigns a corresponding table tag representation.

SUMMARY

The invention provides methods and apparatus, including computer program products, for manipulating components in browser documents. In general, in one aspect, the invention provides methods and apparatus, including computer program products, implementing techniques for manipulating components in browser documents having multiple browser components. The techniques include visualizing a browser document on a display device, indicating at least one editable browser component on the display device, receiving input selecting an editable browser component, and indicating at least one target browser component for the selected editable browser component on the display device.

Particular implementations can include one or more of the following features. The browser document is an HTML document, XML document, WML document or XHTML document. Visualizing the browser document includes displaying the browser document in a graphical user interface. Indicating an editable browser component includes displaying a graphical element identifying the editable browser component as being selectable for editing by the user. Indicating a target browser component includes displaying a graphical element identifying the target browser component as being a possible target for the selected editable browser component. The graphical element identifying the editable browser component or target browser component represents a source marker assigned to the editable browser component or a target marker assigned to the target browser component, respectively.

The techniques can further include receiving input selecting a target browser component and modifying the browser document according to the selected editable browser component and the selected target browser component. Modifying the browser document according to the selected editable browser component and target browser component can include moving or copying the selected editable browser component to a location associated with the selected target browser component.

The invention can be implemented to realize one or more of the following advantages. Source and target markers, and the graphical elements that represent them, can be used to indicate to the user which components in a browser document can be manipulated in editing operations. Having source markers and target markers identify components that can be selected for editing makes facilitates manipulation of complex browser components, such as grids, tables or other complex controls, in a graphical user interface of a conventional browser. A user can graphically edit browser documents that include complex browser components even if HTML representations, such as table tags, cannot be used to represent the complex browser components in the graphical editor.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 1A-1C are block diagrams illustrating a graphical user interface for editing a browser document in one implementation of the invention.

FIGS. 2A-2B are block diagrams illustrating a browser document edited in one implementation of the invention.

Like reference symbols in the various drawings indicate like elements.

DETAILED DESCRIPTION

One implementation of a system in accordance with the invention includes a user interface through which a user can edit a browser document that includes multiple browser components. The system displays a representation of a browser document to the user. The representation indicates browser components that can be edited by the user. The system receives user input selecting one or more of the indicated editable browser components. The system modifies the representation to indicate possible target browser components for the selected editable browser component. The target browser components represent possible target locations to which the selected editable browser component can be moved or copied. Upon receiving further input selecting a target browser component, the system modifies the browser document by moving or copying the selected editable browser component to the selected target browser component.

Figure 1A:
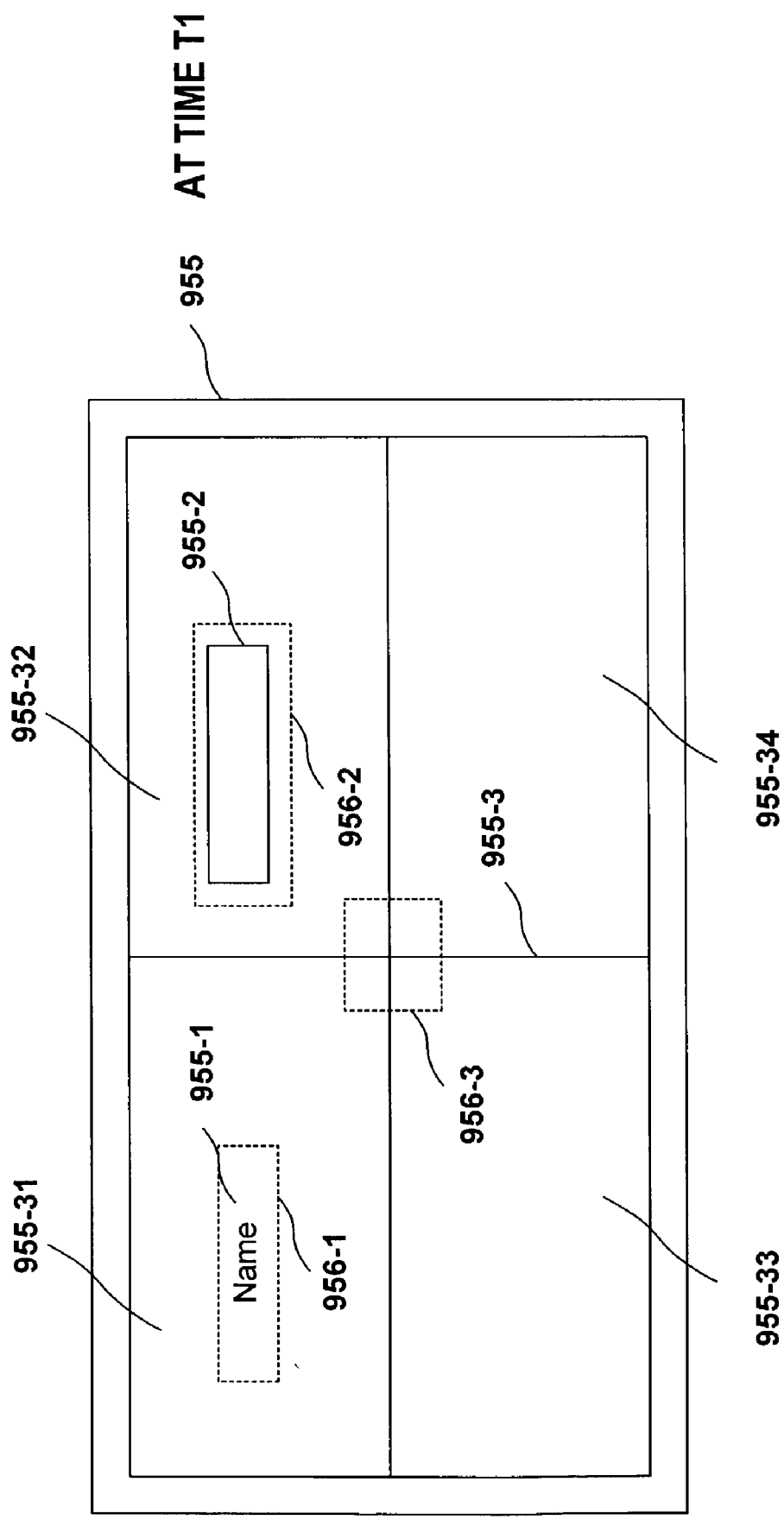
Figure 1C:
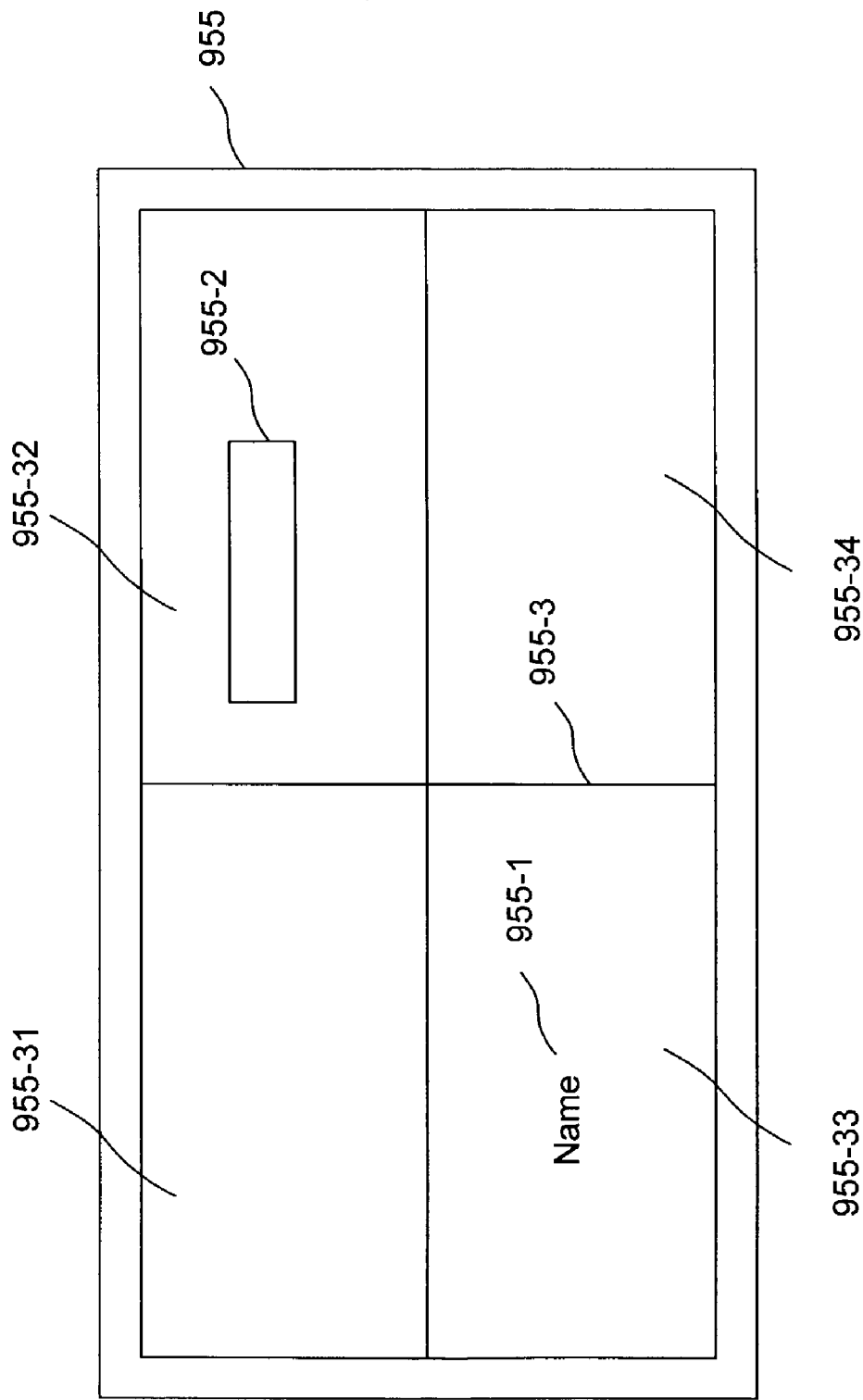

FIGS. 1A-1C illustrate an implementation of a graphical user interface (GUI) 955 in a conventional browser at times T1, T2, and T3. The graphical user interface can be implemented in a browser or other application such as a financial, logistics, or strategic management application, or any other software application. As shown in FIG. 1A, at time T1 the GUI 955 includes a name component 955-1, an input component 955-2, and a grid component 955-3. The grid component 955-3 includes cell components 955-31 to 955-34. The GUI 955 also includes graphical elements 956-1, 956-2 and 956-3, which indicate which components of the GUI 955 can be selected by the user for editing. In the implementation illustrated in FIG. 1A, the editable components are the name component 955-1, the input component 955-2, and the grid component 955-3, represented by dashed squares 956-1, 956-2 and 956-3, respectively. In an alternative implementation, the editable components could also include other components of the GUI 955, for example, cell components 955-31 to 955-34, which would be indicated in GUI 955 by additional graphical elements. As shown in FIG. 1A, the graphical elements can be dashed squares. Alternatively, editable components can be graphically represented by highlighting, blinking, or marking the editable component with some other marker of a particular shape or color. The graphical elements can be displayed in GUI 955 in response to a control signal received from the user indicating the user's desire to edit the appearance of the browser document represented in GUI 955. The control signal can be a control key sequence in a keyboard or a mouse signal, for example, a double-click.

A browser component can be selected for editing by selecting the corresponding graphical element that identifies the component as being editable in the user interface. FIG. 1B shows the GUI 955 at time T2, after the name component 955-1 has been selected for moving. The name component 955-1 can be selected based on a selection signal received from the user, such as a mouse click on the dashed square 956-1 in GUI 955. To confirm selection of an editable browser component, the computer system can change the appearance of the corresponding graphical element—for example, changing square 956-1 from a dashed square to a solid square when name component 955-1 is selected in GUI 955. After the name component 955-1 has been selected, the GUI 955 can be modified to remove graphical elements 956-2 and 956-3 indicating which other browser components can be selected for editing.

After a browser component is selected, the user can manipulate the selected component in GUI 955. Manipulating the selected component can include, for example, moving, copying or deleting the selected component. To aid in moving or copying the selected component, the computer system can indicate, in GUI 955, target components to which the selected component can be moved or copied. The target components for the selected browser component can be identified by further graphical elements in GUI 955. As shown in FIG. 1B, after name component 955-1 is selected, the computer system modifies GUI 955 to display dashed circles 957-3, and 957-31 to 957-34, which represent target locations for the selected name component 955-1. The target location element 957-3 indicates to the user that the name component 955-1 can be moved or copied to the grid component 955-3. Similarly, the target location elements 957-31 to 957-34 indicate that the name component 955-1 can also be moved or copied to the cell components 955-31 to 955-34, respectively. As shown in FIG. 1B, the target locations can be identified to the user by graphical elements such as dashed circles in the GUI 955. Alternatively, the target locations can be highlighted, blinking, or marked with a marker of a particular shape, color or sound.

To move or copy the selected browser component to one of the indicated target locations, the user can select the graphical element corresponding to the desired target location. In the example illustrated in FIG. 1B, the name component 955-1 is moved from the predefined location 956-1 to the target location 957-33 (as represented by arrow 100). The target location 957-33 corresponds to the cell component 955-33.

FIG. 1C shows the GUI 955 at T3, after the name component 955-1 is moved to the cell component 955-33. Alternatively, the name component 955-1 can be moved to the target location 957-3 corresponding to the grid component 955-3. In this case, the name component 955-1 can replace the grid component 955-3 in the representation of the browser document in GUI 955.

FIGS. 2A and 2B illustrate a browser document 200 at times T1 and T3, corresponding to the times shown in FIGS. 1A and 1C, respectively. Browser components of the browser document 200 are visualized by the components of the GUI 955 as discussed below. The browser document 200 can be an HTML document or an XML document or any other kind of structured document in a browser compatible format.

As shown in FIG. 2A at time T1, the browser document 200 includes a grid browser component 200-3 corresponding to the grid component 955-3 in the GUI 955. The grid browser component 200-3 includes cell browser components 200-31 to 200-34, corresponding to the cell components 955-31 to 955-34, respectively. The first cell browser component 200-31 includes a name browser component 200-1 corresponding to the name component 955-1. The second cell browser component 200-32 includes input browser component 200-2 corresponding to the input component 955-2. The grid browser component 200-3 has multiple browser components, and is therefore considered to be a complex browser component.

Editable browser components in the browser document are assigned source markers that indicate that the associated browser component can be selected by the user for editing. Generally, source markers will be assigned and created in the browser document by a document author using an authoring tool. As illustrated in FIGS. 2A and 2B, source markers 210', 220' and 250' (represented by darkened squares) are assigned to the name 200-1, the input 200-2, and the grid 200-3 browser components, respectively, indicating that those browser components can be selected for editing in GUI 955. In the example shown in FIGS. 2A and 2B, the cell browser components 200-31 to 200-34 have no assigned source markers. Optionally, however, source markers can be assigned to the cells browser components 200-31 to 200-34, as well. In FIGS. 2A and 2B, source markers 210', 220' and 250' are represented by dark squares; alternatively, other elements could be used to represent source markers in browser document 200. The source markers 210', 220' and 250' are graphically represented in the GUI 955 at time T1 (FIG. 1A) by the graphical elements (dashed squares) 956-1, 956-2 and 956-3, respectively.

Target browser components are assigned target markers that indicate that editable browser components can be placed at the associated browser component—i.e., that the associated browser component is a possible target for another browser component selected by the user. Generally, target markers will be assigned and created in the browser document by a document author using an authoring tool. As illustrated in FIGS. 2A and 2B, a target marker 250 (represented by a circle) is assigned to the grid browser component 200-3. Similarly, target markers 210 to 240 are assigned to the cell browser components 200-31 to 200-34, respectively. The target markers 250, and 210 to 240 are graphically represented in the GUI 955 at time T2 (FIG. 1B) by the graphical elements (dashed circles) 957-3, and 957-31 to 957-34, respectively. Source and target markers can be implemented as meta data of the browser document. The meta-data can be stored as a portion of an interface, a repository, or a file.

As shown in FIG. 2B, at time T3 the browser document 200 has been modified by the computer system to reflect the changes in the GUI 955 due to the user's interaction as described with reference to FIGS. 1A-1C. Specifically, as discussed above in connection with FIG. 1B, in response to the user's selection of target location 957-33 for the name component 955-1, the name browser component 200-1 is moved to the third cell browser component 200-33 corresponding to the target location 957-33. Alternatively, instead of being moved, the name browser component 200-1 can be copied to the third cell browser component 200-33. In alternative implementations, any of the target locations can be selected by the user. Also, the name browser component 200-1 can be completely deleted from the browser document 200. The computer system modifies the browser document 200 accordingly.

The following XML code sections provide a more detailed example of one implementation of browser document 200 at times T1 and T3 as discussed above. Because source and target markers are implemented in meta data, they do not appear in the XML code.

TABLE 1

XML representation of browser document 200 at time T1:

```
<grid>
    <row>
        <cell>
            Name
        </cell>
        <cell>
            <inputfield/>
        </cell>
    </row>
    <row>
        <cell/>
        <cell/>
    </row>
</grid>
```

TABLE 2

XML representation of browser document 200 at time T3:

```
<grid>
    <row>
        <cell/>
        <cell>
            <inputfield/>
        </cell>
    </row>
    <row>
        <cell>
            Name
        </cell>
        <cell/>
    </row>
</grid>
```

Figure 3:
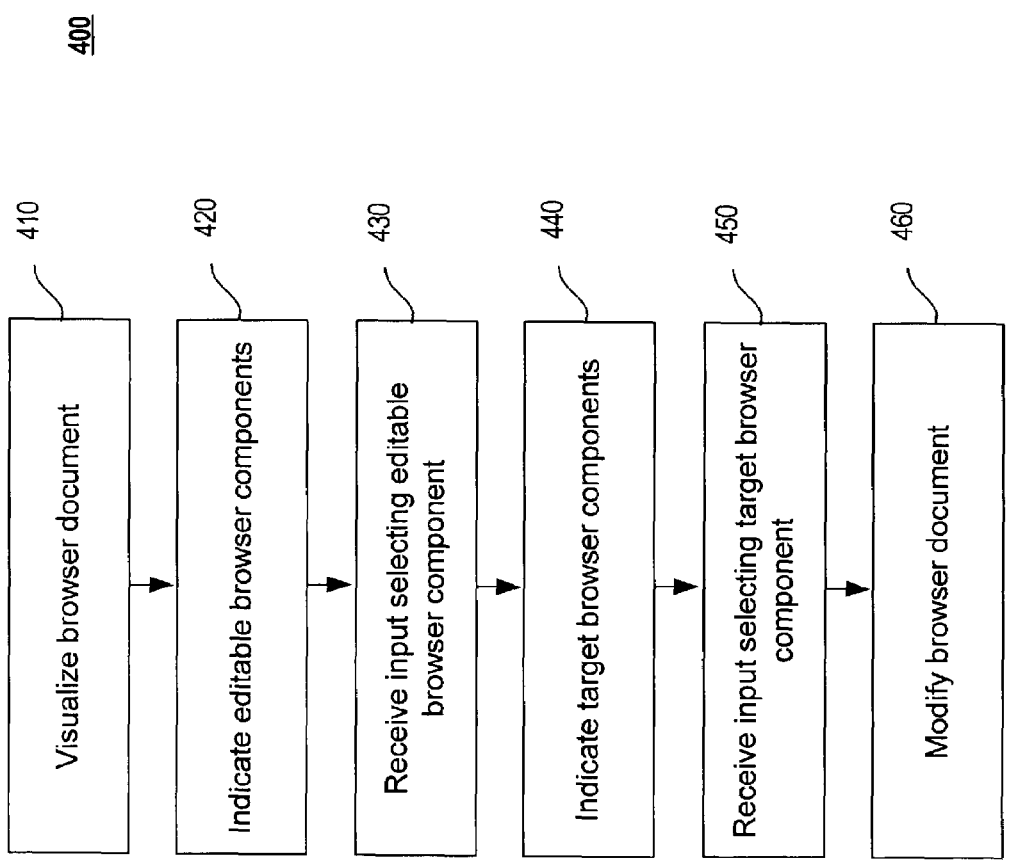
FIG. 3 is a flowchart showing a method for editing a browser document.

FIG. 3 illustrates one implementation of a method 400 for editing a browser document 200 according to one implementation of the invention. The browser document 200 includes browser components 200-1, 200-2, 200-3, 200-31, 200-32, 200-33, and 200-34 (see, e.g., FIG. 2A). The method 400 can be executed by a computer of a computer system and implemented by a computer program. To begin the method, the browser document 200 is visualized for the user (step 410). The browser document can be visualized, e.g., in a conventional browser running on the computer as a graphical user interface 955. The browser document 200 is a structured document, for example, an HTML, XML, WML, or XHTML document.

The computer indicates to the user which browser components are editable (step 420). The editable browser components can be, e.g., the browser components 200-1, 200-2, and 200-3 of browser document 200 (FIG. 2A). The user can trigger the indicating step 420, e.g., with a control signal such as a mouse click or a control key sequence. To indicate the editable browser components 200-1, 200-2, and 200-3, the computer can use graphical elements, for example, the dashed squares 956-1, 956-2, and 956-3 shown in FIG. 1A. A graphical element identifying an editable browser component is a representation of a corresponding source marker. As shown, e.g., in FIG. 2A, source markers 210', 220', and 250' are assigned to the editable browser components 200-1, 200-2, and 200-3, respectively.

The computer receives input selecting an editable component (step 430). The user can select, e.g., the editable browser component 200-1. The selection can be made, e.g., by a mouse click on the graphical element 956-1 corresponding to the editable browser component 200-1.

In response to the selection of an editable component, the computer indicates to the user what target browser components are available for the selected editable browser component—for example, the target browser components 200-3, 200-31, 200-32, 200-33, and 200-34. A target component can serve as target for the selected editable browser component 200-1. To indicate the target browser components 200-3, 200-31, 200-32, 200-33, and 200-34, the GUI 955 can present to the user corresponding graphical elements 957-3, 957-31, 957-32, 957-33, and 957-34, respectively. A graphical element identifying a target browser component is a representation of a corresponding target marker. As shown, e.g., in FIG. 2A, target markers 250, 210, 220, 230, and 240 are assigned to the target browser components 200-3, 200-31, 200-32, 200-33, and 200-34, respectively.

If the user desires to move or copy the selected editable browser component to one of the indicated target components, the user can make a selection from the target browser components. For example, the user can select the target browser component 200-33 (e.g., the corresponding graphical element identifying the desired target browser component). The computer receives input selecting the desired target component (step 450). The input can be control signals resulting from a mouse click, e.g., on the graphical element 957-33 corresponding the selected target browser component 200-33. Alternatively, the input can take the form of control signals resulting from a drag and drop operation dragging the selected editable browser component 200-1 onto the graphical element representing the selected target browser component 200-33. The computer may also receive input indicating that the user desires some other editing operation, such as deletion of the selected editable browser component, or that the user desires no editing operation at all.

The computer modifies the browser document 200 according to the selections received from the user (step 460). In one implementation, the computer modifies the browser document by moving the selected editable browser component 200-1 to the selected target browser component 200-33. After the modification, the selected target browser component 200-33 includes the selected editable browser component 200-1. Alternatively, the computer can copy the selected editable browser component 200-1 to the selected target browser component 200-33. After the copying, both the selected target browser component 200-33 and the source browser component 200-31 include the selected editable browser component 200-1. Alternatively, the computer can delete the selected editable browser component 200-1 completely from the browser document 200. The user can choose between the different modifying alternatives that include, e.g., moving, copying, and deleting, using functions provided by the user interface, such as context menus that are launched by the user using, e.g., a mouse button or a control key sequence.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, steps of the invention can be performed in a different order and still achieve desirable results.

What is claimed is:

1. A method, comprising:
   displaying on a display device a browser document having a set of tags associated with a markup language, including a set of editable browser components and a set of target browser components;
   responsive to a signal to edit the browser document, presenting a visual representation associated with each of the editable browser components and indicating that each editable browser component is selectable for editing;
   responsive to a signal to select an editable browser component from the set of editable browser components, displaying one or more identifiers on the display device for the set of target browser components; and
   responsive to a signal to select a target browser component from the set of target browser components. modifying a selected set of tags of the browser document as a function of the selected editable browser component and the selected target browser component.

2. The method of claim 1, wherein the browser document is an HTML document, XML document, WML document or XHTML document, and
   wherein displaying on a display device a browser document comprises displaying the browser document in a graphical user interface.

3. The method of claim 1, wherein:
   indicating that each editable browser component is selectable for editing comprises displaying a graphical element identifying at least one editable browser component as being selectable for editing.

4. The method of claim 3, wherein:
   the graphical element identifying the at least one editable browser component comprises a source marker assigned to the at least one editable browser component.

5. The method of claim 1, wherein:
   displaying one or more identifiers on the display device for a set of target browser components comprises displaying a graphical element identifying at least one target browser component as being a possible target for the selected editable browser component.

6. The method of claim 5, wherein:
   the graphical element identifying the at least one target browser component comprises a target marker assigned to the at least one target browser component.

7. The method of claim 1, wherein:
   modifying a selected set of tags of the browser document as a function of the selected editable browser component and the selected target browser component comprises moving the selected editable browser component to a location associated with the selected target browser component.

8. The method of claim 1, wherein:
   modifying a selected set of tags of the browser document as a function of the selected editable browser component and the selected target browser component comprises copying the selected editable browser component to a location associated with the selected target browser component.

9. A computer system comprising:
   a display device operable to display a browser document stored in a memory of the computer system, the browser document having a set of tags associated with a markup language, including a set of editable browser components and a set of target browser components;
   an input device operable to receive a signal to select an editable browser component and to receive a signal to select a target browser component;
   a processor operable to, responsive to a signal to edit the browser document, cause the display device to present a visual representation associated with each of the editable browser components, responsive to a signal to select an editable browser component from the set of editable browser components, cause the display device to display one or more identifiers on the display device for the set of target browser components, and responsive to a signal to select a target browser component from the set of target browser components, modify a set of tags of the browser document as a function of the selected editable browser component and the selected target browser component.

10. The computer system of claim 9, wherein:
the display device is operable to display a graphical representation of each of the editable browser components, the graphical representation including a graphical element comprising a source marker that is assigned to each of the editable browser components.

11. The computer system of claim 9, wherein:
the display device is operable to display a graphical representation of each of the target browser components, the graphical representation including a graphical element comprising a target marker that is assigned to each of the target browser components.

12. The computer system of claim 9, wherein:
the processor is operable to modify a selected set of tags of the browser document by moving the selected editable browser component to a location associated with the selected target browser component.

13. The computer system of claim 9, wherein:
the processor is operable to modify a selected set of tags of the browser document by copying the selected editable browser component to a location associated with the selected target browser component.

14. A computer program product tangibly embodied in a storage device, the computer program comprising instructions operable to cause a computer system to:

display on a display device a browser document having a set of tags associated with a markup language, including a set of editable browser components and a set of target browser components;

responsive to a signal to edit the browser document, present a visual representation associated with each of the editable browser components and indicating that each editable browser component is selectable for editing;

responsive to a signal to select an editable browser component from the set of editable browser components, display one or more identifiers on the display device for the set of target browser components; and responsive to a signal to select a target browser component from the set of target browser components, modify a selected set of tags of the browser document as a function of the selected editable browser component and the selected target browser component.

15. The computer program product of claim 14, further comprising instructions to display a graphical element identifying each of the editable browser components.

16. The computer program product of claim 15, wherein:
the graphical element identifying each of the editable browser components comprises a source marker that is assigned to each of the editable browser components.

17. The computer program product of claim 14, further comprising instructions to display a graphical element identifying each of the target browser components.

18. The computer program product of claim 17, wherein:
the graphical element identifying each of the target browser components comprises a target marker that is assigned to each of the target browser components.

19. The computer program product of claim 14, wherein:
the instructions to modify a selected set of tags of the browser document include instructions to move the selected editable browser component to a location associated with the selected target browser component.

20. The computer program product of claim 14, wherein:
the instructions to modify a selected set of tags of the browser document include instructions to copy the selected editable browser component to a location associated with the selected target browser component.

21. The computer program product of claim 18, further comprising instructions to:
use meta data to describe the source marker and the target marker, wherein the meta data and interface information is stored in one of a repository and a file.

* * * * *